United States Patent [15] 3,697,801
Eulenberg [45] Oct. 10, 1972

[54] CIRCUIT ARRANGEMENT FOR PRODUCING A LINE-FREQUENCY SAWTOOTH-CURRENT HAVING A FIELD-FREQUENCY-VARYING AMPLITUDE IN A TELEVISION DISPLAY DEVICE

[72] Inventor: Hannspeter Eulenberg, Bauweg, Germany

[73] Assignee: U.S. Philips Corporation, New York, N.Y.

[22] Filed: June 13, 1969

[21] Appl. No.: 832,957

[30] Foreign Application Priority Data

July 11, 1968 Netherlands..............6809798

[52] U.S. Cl...............................................315/27 TD
[51] Int. Cl...............................................H01j 29/70
[58] Field of Search..........................315/27 R, 27 TD

[56] References Cited

UNITED STATES PATENTS 3,440,483 4/1969 Kaashoek et al. ...........315/24

*Primary Examiner*—Carl D. Quarforth
*Assistant Examiner*—J. M. Potenza
*Attorney*—Frank R. Trifari

[57] ABSTRACT

A TV deflection circuit for producing a line frequency sawtooth current whose amplitude varies at the field frequency said variation being approximately parabolic to provide East - West raster correction for any pincushion distortion and approximately sawtooth shaped to provide color correction in the case of a color TV tube. The circuit includes a modulator having an electronic switch controlled by a line frequency signal. During the forward stroke of the constant amplitude sawtooth current supplied by a line deflection current generator to the line deflection coil, the switch connects a field deflection current generator to a resonant circuit including the parallel combination of a capacitor and an inductor. The inductor comprises either the line or field deflection coils, or both. The resonant circuit has a resonant period that is approximately twice the flyback time of the line frequency deflection current.

13 Claims, 2 Drawing Figures

Figure 1:
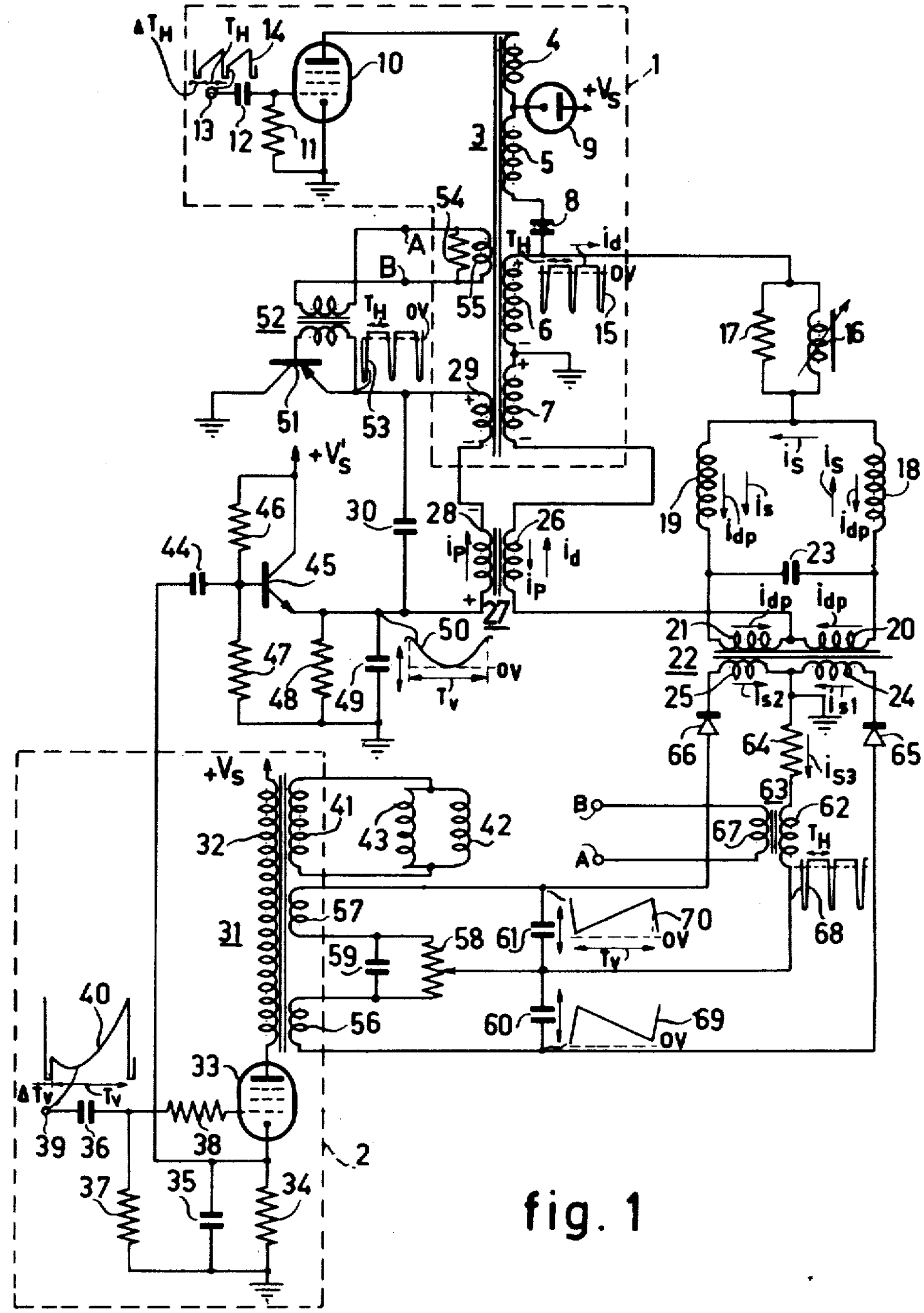

INVENTOR.
HANNSPETER EULENBERG
BY

AGENT

INVENTOR.
HANNSPETER EULENBERG
BY
Frank R. Trifari
AGENT

CIRCUIT ARRANGEMENT FOR PRODUCING A LINE-FREQUENCY SAWTOOTH-CURRENT HAVING A FIELD-FREQUENCY-VARYING AMPLITUDE IN A TELEVISION DISPLAY DEVICE

This invention relates to a televisiondisplay having a circuit arrangement for producing a line frequency sawtooth current having a field frequency-varying amplitude. This arrangement comprises a line and field deflection current generator for supplying a line or field frequency sawtooth current of substantially constant amplitude to a line or field deflection coil and a modulator controlled by the field deflection current generator for amplitude modulating the line frequency sawtooth current at the field frequency.

In Belgian Pat. No. 712.525 there is disclosed a color television display device in which the color correction on the screen of a display tube of the device is performed by means of a line frequency sawtooth current having a field frequency-varying amplitude. From the beginning to the end of a stroke of the field frequency sawtooth current the amplitude of the line frequency sawtooth correction current has to decrease substantially linearly from a maximum value to zero, after which a substantially identical increase has to occur in the opposite direction of the current. This correction current is superimposed on the deflection current of substantially constant coil, passing through the line and/or field deflection soil, said current being supplied by the line or field deflection current generator to the relevant coil. The division of a deflection coil into two coil halves arranged substantially symmetrically on either side of the neck of a display tube in the display device provides the possibility of adding the correction current in one coil half to the deflection current of substantially constant amplitude and of subtracting it therefrom in the other coil half. The magnetic deflection field of one coil half will thus be increased, whereas that of the other coil half will be attenuated substantially to the same extent. In said Patent it is disclosed that the effect is such that the correction current produces a magnetic quasi-quadripole field superimposed on the normal bipolar magnetic field for deflecting the electron beam in the display tube.

The magnetic quasi-quadripolar field causes the circular or elliptical section of the electron beam to assume a tilted elliptical shape. A plurality of electron beams produced in the display tube, having their cross sections located, for example, on the circumference of a circle, are displaced so that they lie on a tilted circumference of an ellipse. Since the so-called anisotropic astigmatism of a deflection coil produces a similar deformation in dependence upon the extent of deflection, it is possible to compensate it by means of a deformation in the opposite sense produced by said correction current.

In said Patent there is described inter alia a device in which the modulator is formed by a multiplier to which information is applied relative to the line and field deflection current. In a further embodiment of the multiplier an arrangement is used in which the known Hall effect is utilized.

An object of the invention is to provide a circuit arrangement in which the modulator is constructed in a very simple manner, so that, without any disturbing phenomena, a great field frequency amplitude variation of a line frequency sawtooth current is obtained. A circuit arrangement according to the invention is characterized in that the modulator comprises a line-frequency controlled electronic switch which connects, during the forward stroke of horizontal sawtooth current the field deflection current generator (providing a voltage having the field frequency variation) to a resonant circuit including the parallel combination of a capacitor and an inductor comprising the line and field deflection coil respectively. The resonant period of the resonant circuit is substantially twice the fly-back time of the line frequency sawtooth deflection current.

A further circuit arrangement embodying the invention is characterized in that the inductor of the resonant circuit comprises at least four inductive components arranged in a bridge connection, two of which are formed the two coils halves of the respective line and field deflection coil.

The use of a circuit arrangement in accordance with the invention for producing a line frequency sawtooth current of field frequency-varying amplitude in a display device is not restricted to the performance of the correction function as disclosed in said patent.

A circuit arrangement in accordance with the invention also permits of obviating part of the deformation appearing in the form of the so-called pincushion distortion in the raster on the screen of a display tube in a monochrome or color television display device.

The pincushion distortion is due to the slight curvature of the surface of the screen of the display tube and to the magnetic field distribution in the line and field deflection coils. The point of impact of an electron beam on the screen will be displaced additionally in the deflection direction in accordance with the extent of deflection when the deflection angle is larger and hence the distance to be covered by the electrons is longer. Said additional displacement, which varies as a parabolic function, can be eliminated by superimposing a correction current of parabolic waveform and of opposite sense on a deflection current of constant amplitude. For the line deflection current this results in a line frequency sawtooth current whose amplitude varies during the forward stroke of a field period as a parabolic function so that substantially at the middle of the stroke a maximum value is attained. In the horizontal line deflection and in the vertical field deflection said corrected line deflection current can provide the so-called East-West raster correction of the pincushion distortion.

A circuit arrangement in accordance with the invention for performing the East-West raster correction of the pincushion distortion on the screen of a display tube is characterized in that an inductive component of the resonant circuit inductor is connected in series with the arrangement of the line deflection current generator and the line deflection coil.

Figure 2:
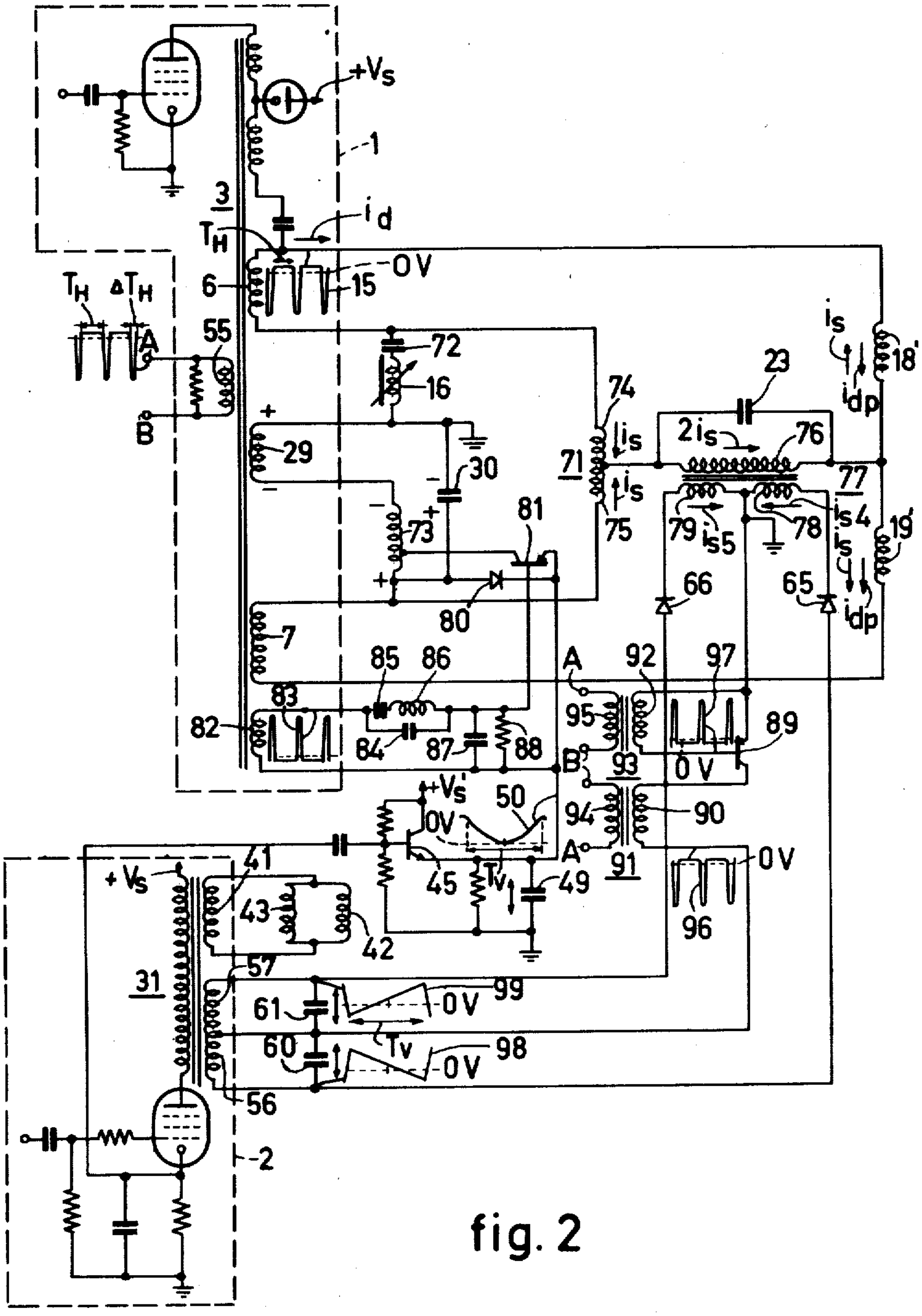

The invention will be described more fully by way of example with reference to the accompanying figures, in which FIG. 1 shows two embodiments of a circuit arrangement according to the invention, in which the said two corrections are performed with the aid of the line deflection coil, which consists of two halves fed in parallel combination by the line deflection current generator, and FIG. 2 shows circuit arrangements according to the invention similar to those of FIG. 1 in which, however, the halves of the line deflection coil are fed in series combination by the line deflection current generator.

Referring to FIG. 1, reference numeral 1 designates a line deflection current generator and reference numeral 2 a field deflection current generator. The generators 1 and 2 may form part of a monochrome or color television display device. The line deflection current generator 1, which will briefly be termed line generator 1 hereinafter, may be constructed in any way and be provided with a series or shunt efficiency circuit. The line generator 1 may furthermore serve for producing a high direct voltage and be constructed as a fly-back high voltage generator. The field deflection current generator 2, which will be termed field generator 2 hereinafter, may also be of a more or less conventional type and its construction is not essential for the purposes of this invention.

The line generator 1 comprises a transformer 3 having four windings 4, 5, 6 and 7, pairwise connected in series. These windings and the windings to be mentioned hereinafter are considered to be wound in the same sense of unless otherwise stated. The series combination of the windings 4 and 5 is connected through a capacitor 8 to the windings 6 and 7. The junction of the windings 6 and 7 is connected to ground. The junction of the windings 4 and 5 is connected to the cathode of a diode 9, the anode of which is connected to a positive voltage $+V_s$ at one terminal of a supply source (not shown). The other terminal of the supply source is connected to ground. The diode 9 and the capacitor 8 form part of a series efficiency circuit.

The top end of the winding 4 of the transformer 3 is connected to a pentode amplifying element 10, which is connected to ground at its cathode. The control grid of the pentode amplifying element 10 is connected to ground through a leakage resistor 11 and through a separation capacitor 12 to an input terminal 13 of the line generator 1. To the input terminal 13 of the line generator 1 is applied a control signal 14 which provides the periodic drive of the amplifying element 10. The control signal 14 has a periodic, pulsatory portion for cutting off the amplifying element 10 for a time $\Delta T_H$ and a portion increasing linearly for a time $T_H$ in accordance with the structure of the transformer 3.

In the line generator 1 the control signal 14 produces, with the aid of the parasitic capacitances of the transformer 3, a voltage across the windings 6 and 7. This voltage is indicated for the winding 6 by the waveform 15. The free end of the winding 7 of the transformer 3 will be at a voltage which is equal to the voltage 15, but with opposite polarity. This is apparent from the + and − polarities indicated on the windings 6 and 7.

In order to produce a line frequency sawtooth current of substantially constant amplitude, which current is indicated by $i_d$ at the voltage 15, through a coil or a set of partial coils, it is sufficient to connect this coil or set of partial coils to the series combination of the windings 6 and 7 of the line generator 1. It is, for example, possible to connect the parallel combination of a variable, premagnetized linearity coil 16 and a damping resistor 17 in series with the line deflection coil consisting of two parallel-connected, substantially symmetrical coil halves 18 and 19, directly to the line generator 1. The coil halves 18 and 19 may be further divided into further partial coils.

In order to produce in accordance with the invention field frequency modulated, unequal, line frequency sawtooth currents through the line deflection coil halves 18 and 19, the latter are included in a bridge circuit. The line generation 1 feeds the bridge circuit between the interconnected ends of the deflection coil halves 18 and 19 and the junction of two substantially identical, series-connected windings 20 and 21 of a transformer 22. The junction of the coil half 18 and the winding 20 is connected through a capacitor 23 to the junction of the coil half 19 and the winding 21. The transformer 22 comprises a primary winding having two series-connected, substantially identical windings 24 and 25, to which is applied from the field generator 2 a line frequency-controlled voltage having the desired field frequency-sawtooth variation. The use of the transformer 22 in a bridge circuit prevents the line generator 1 and the field generator 2 from interfering with each other in a harmful manner via the transformer 22. In order to reduce leakage fields and the consequent stray inductances, the windings 20, 21 and 24, 25 of the transformer 22 may be wound in bifilar fashion.

According to a further aspect of the invention, a line frequency sawtooth deflection current is produced through the two line deflection coil halves 18 and 19 with equidirectional field frequency amplitude variations of substantially equal values in the two halves. This is achieved by connecting a winding 26 of a transformer 27 between a supply point of said bridge circuit (18 to 23) and the line generator 1. The transformer 27 comprises a primary winding 28 to which the field generator 2 applies a line frequency-controlled voltage having a parabolic field frequency variation. In order to obtain decoupling of the line generator 1 from the circuit including the primary winding 28 of the transformer 27, a winding 29 is provided on the transformer 3 and is connected in series with the winding 28. The voltage derived from the field generator 2 is applied to this series combination, across which a capacitor 30 is connected in parallel.

On the basis of the field generator 2 and the voltages having the desired field frequency variations to be supplied by said generator the two circuit arrangements embodying the invention will be described more fully hereinafter, The field generator 2 comprises a transformer 31, a primary winding 32 of which is connected at one end to a positive voltage $+V_s$ terminal and at the other end to ground through a pentode amplifying element 33 and the parallel combination of a resistor 34 and a capacitor 35 included in the cathode lead of said element. Through a separation capacitor 36 and a leakage resistor 37 to ground and through a current limiting resistor 38 a control signal 40 applied to an input terminal 39 is supplied to the control grid of the pentode amplifying element 33. The periodic control signal 40 has a function of time, a pulsatory portion for cutting off the amplifying element 33 for a time $\Delta T_V$ and, in addition, a parabolically varying, linearly increasing portion for controlling the amplifying element 33 for a time $T_V$.

The transformer 31 is provided with a secondary winding 41, across which a sawtooth voltage is produced by means of the control signal 40 and with the aid of parasitic capacitances (not shown) of transformer 31. The winding 41 is connected to the parallel combination of two coil halves 42 and 43, which together form the field deflection coil. As a result of the high ohmic resistance of the field deflection coil halves 42 and 43, a field frequency sawtooth deflection current passes through them. The forward stroke and the fly-back stroke of the field frequency sawtooth deflection current (having a substantially constant amplitude produced by the field generator 2) correspond to the periods $T_V$ and $\Delta T_V$ respectively, of the control signal 40.

Under the action of the control signal 40 a current passes through the amplifying element 33 for the field scan period $T_V$, which current is formed by a parabolically varying current and a linearly increasing current. By proper proportioning of the capacitor 35 and the resistor 34 of the parallel combination included in the cathode lead of the amplifying element 33, an RC-time constant can be obtained by means of which only a substantially parabolic voltage is developed across the parallel combination for the field scan period $T_V$.

In order to perform the East-West frame correction of the pincushion distortion in accordance with the invention, the resultant substantially parabolic voltage has to be applied to a modulator. For this purpose the cathode of the pentode amplifying element 33 in the field generator 2 is connected through a separation capacitor 44 to the base electrode of an npn-type transistor 45, connected as an emitter follower. The collector electrode of the transistor 45 is connected to a positive direct voltage $+V'_s$ at a terminal of a supply source (not shown), the other terminal of which is grounded. The terminal having the voltage $+V'_s$ is connected through series-connected resistors 46 and 47 to ground, the junction of said series combination being connected to the base electrode of the transistor 45. The emitter electrode of transistor 45 is connected to ground through the parallel combination of a resistor 48 and a capacitor 49. Therefore, during a field scan period $T_V$ the field generator 2 applies to the capacitor 49 a substantially parabolically varying voltage 50. With the voltage 50 a broken line $o$V indicates ground potential. The same applies to the voltage to be mentioned hereinafter. A broken line without further references indicates an average value.

In the circuit arrangement embodying the invention the upper terminal of the capacitor 49 is connected to a circuit formed by the parallel combination of capacitor 30 and windings 28 and 29 in series with an emitter-collector circuit of pnp-type transistor 51, the collector of which is grounded. The transistor 51 serves as a line frequency-controlled electronic switch which conducts current during the line scan period $T_H$. For this purpose a secondary winding of a transformer 52 is included between the emitter and the base of the transistor 51 for providing a switching voltage 53. The switching voltage 53 is obtained by connecting the primary winding of transformer 52 to two terminals A and B. These terminals are connected to a winding 55 provided on the transformer 3 in the line generator 1 and shunted by a damping resistor 54. As a matter of course winding 55 of transformer 3 may alternatively be connected directly to the transistor 51.

The circuit arrangement shown in FIG. 1 for the East-West raster correction may be simplified as follows for explaining the operation. A bridge circuit includes the line deflection coil halves 18 and 19 and the windings 20, 21, with which the capacitor 23, which has no voltage in the state of equilibrium of the bridge, is connected in parallel. At the windings 20 and 21 arrows indicate the positive directions of the deflection currents passing through the coil halves 18 and 19. The opposite sense of the arrows indicates that no voltage is developed by equal deflection currents through the series combination of the bifilar windings 20 and 21. Therefore, capacitor 23 may be considered to be short-circuited so that in fact a through-connection of the coil halves 18 and 19 is directly established to the relevant end of the winding 26 of the transformer 27. The circuit including the linearity coil 16, the resistor 17 and the deflection coil halves 18 and 19 is fed through the windings 6 and 7 of transformer 3 in the line generator 1 and through the secondary winding 26 of transformer 27.

The line generator 1 supplies a line frequency sawtooth deflection current of substantially constant amplitude. The positive sense of this current $i_d$ is indicated by an arrow at the voltage 15 across the winding 6. The substantially constant amplitude of the current $i_d$ may be derived from the voltage 15, which has substantially the same value during each line scan period $T_H$.

The primary winding 28 of the transformer 27 is connected in series with an winding 29 of transformer 3. For the explanation of the arrangement the influence of the winding 29 may to a first approximation, be neglected. The voltage 50 across the capacitor 49 is applied to this series combination (with which capacitor 30 is connected in parallel since) the transistor 51 is conducting during the line scan period $T_H$. During the line scan period $T_H$, which is short as compared with the field scan period $T_V$, the voltage 50 remains more or less constant, in dependence upon the instantaneous, substantially constant voltage value and upon the mainly inductive load of transformer 27, a linearly varying current $i_p$ will pass through the winding 28 and at the end of the line scan period $T_H$ it will attain a given maximum value in the positive sense indicated by the arrow. The transistor 51 is cut-off under the control of the switching voltage 53 during the line fly-back period $\Delta T_H$ thereby exciting a resonant circuit is. This resonant circuit comprises an inductance mainly determined by the parallel combination of the mutual inductances of transformer 27 and the parallel-connected, magnetically weakly coupled line deflection coil halves 18 and 19. The capacitance of the resonant circuits is determined mainly by the capacitor 30. The stray inductances of the inductive components of the device, the comparatively low inductance of the linearity coil 16 and the parasitic capacitances can be neglected in this discussion. By means of capacitor 30 the period of the resonant circuit (18, 19, 27, 30) may be substantially equalized to twice the line fly-back time $\Delta T_H$. At the end of the line fly-back time $\Delta T_H$ the current $i_p$ will attain substantially the given maximum value in the negative sense after half a period of a cosinusoidal variation; then a further cycle may occur.

Through the winding 28 of transformer 27 a line frequency sawtooth current $i_p$ is produced, the amplitude of which is determined during the field scan period $T_V$ by the instantaneous value of the voltage 50. This results in a parabolically modulated, line frequency sawtooth current $i_p$ whose envelope corresponds to the variation of the voltage 50 during the field scan period $T_V$. With the transformer 27 having, for example, a transformation ratio of 1 : 1, the winding 26 will be traversed by an equal current $i_p$, the positive direction of which is indicated by an arrow. It will be seen from the drawing that the line deflection current $i_d$ supplied by the line generator 1 and the correction current $i_p$ supplied via the transformer 27 flow in opposite directions so that they together provide a current $i_d - i_p$. To the current $i_{dp}$ passing through the line deflection coil halves 18 and 19, the positive direction of said current being indicated by an arrow, it follows that $i_{dp} = \frac{1}{2}(i_d = i_p)$. As a result, the line deflection coil halves 18 and 19 are traversed by a line frequency sawtooth deflection current $i_{dp}$ whose amplitude increases parabolically from the beginning up to about the middle of a field scan period $T_V$ to a maximum value which is determined by the substantially constant amplitude of the current $i_d$, after which said amplitude decreases again parabolically up to the end of the field scan period $T_V$.

The winding 29 of transformer 3 is connected in series with the winding 28 of transformer 27 in order to prevent the current $i_d$ from being transferred from winding 26 to winding 28. Across the winding 29 a voltage is produced which exhibits, as a function of time, the same variation as the voltage 15 across winding 6. Under the influence of the current $i_d$ passing through winding 26 an equal voltage is produced across winding 28. It will be apparent from the polarities indicated by + and − signs that the induced equal voltages across windings 28 and 29 have opposite polarities and thus counterbalance each other. Therefore the line generator 1 cannot affect the modulator including the line deflection coil halves 18 and 19, the transformer 27, the capacitor 30 and the line frequency-controlled transistor 51. The influence of the current $i_p$ passing through the winding 29 on the other windings of transformer 3 is negligible due to the very great difference between the number of turns.

The East-West raster correction of the pincushion distortion by means of the currents $i_{dp}$ passing through the line deflection coil halves 18 and 19 is achieved by subtracting a correction current $i_p$ from the deflection current $i_d$. The parabolically varying amplitude of the line frequency sawtooth correction current $i_p$ is at a maximum at the beginning and at the end of the field scan period $T_V$ and approximately zero at about the middle of said period. A similarly varying current $i_{dp}$ may be obtained by adding to the deflection current $i_d$ a correction current $i_p$, which is substantially zero at the beginning and at the end of the field scan period $T_V$ and attains the maximum value approximately at the middle of said period. In the circuit arrangement shown in FIG. 1 said addition can be carried out in a simple manner, for example, by substituting the connecting point of the capacitor 49 for that of the transistor 51, serving as a switch. The capacitor 49 has to be at a positive voltage during a field scan period $T_V$, the variation of said voltage being identical with that of the reflection of the voltage 50 with respect to the ground potential $o_V$.

In order to carry out said color correction on the screen of a display tube in a color television display device, a field frequency voltage of more or less sawtooth-like waveform has to be applied to the modulator in a circuit arrangement in accordance with the invention. For this purpose the transformer 31 of the field generator 2 is provided with two windings 56 and 57 which are connected in series through the parallel combination of a potentiometer 58 and a field frequency decoupling capacitor 59. The free ends of the windings 56 and 57 are interconnected through two series-connected capacitors 60 and 61. The junction of the series combination of capacitors 60 and 61, which form a short-circuit for line frequency signals, is directly connected to the tapping of the potentiometer 58 and is connected through the series combination of a secondary winding 62 of a transformer 63 and a resistor 64 to the ground-connected junction of windings 24 and 25 of transformer 22. The end of winding 56 connected to capacitor 60 is connected to the anode of a diode 65 whose cathode is connected to the free end of winding 24. In a similar manner the free end of winding 57 is connected via a diode 66 to the free end of winding 25. The transformer 63 comprises a primary winding 67 connected to the terminals A and B of the winding 55 of the line generator 1 for producing a switching voltage. Near one end of winding 62 the line frequency switching voltage appearing there is designated by reference numeral 68.

The field generator 2 applies to the terminals of the capacitors 60 and 61 remote from the potentiometer 58 field frequency sawtooth voltages 69 and 70, which have substantially equal amplitudes at the central position of the tapping of potentiometer 58. At the beginning of a field scan period $T_V$ the voltage 69 has a maximum value and the voltage 70 has a minimum value, which values remain more or less constant for a line scan period $T_H$. The switching voltage 68 of positive value renders the diodes 65 and 66 conducting and holds them conducting for a line scan period $T_H$. Thus, linearly varying currents $i_{s1}$ and $i_{s2}$ will pass, in dependence upon the instantaneous values of voltages 69 and 70, through the windings 24 and 25 of the mainly inductively loaded transformer 22. During the line scan period $T_H$ the influence of capacitor 23 is nil since it is without voltage when the bridge circuit is adjusted to the state of equilibrium. Owing to the opposite directions (indicated by arrows) of the currents $i_{s1}$ and $i_{s2}$ through the, for example, bifilar windings 24 and 25, only a current $i_{s1} - i_{s2}$ will produce a magnetic flux in transformer 22. Thus, in the series combination of windings 20 and 21 an approximately linearly varying current $i_s = 1/a(i_{s1} - i_{s2})$ is induced, wherein $a$ represents the transformation ratio of the windings 20, 21 and 24, 25 of transformer 22. The current $i_s$ passes through the series combination of the line deflection coil halves 18 and 19 so that the coil half 18 is traversed by a current $i_{dp} - i_s$ and the coil half 19 is traversed by a current $i_{dp} + i_s$.

The negative pulse of the switching voltage 68 cuts off the diodes 65 and 66 during the line fly-back time $\Delta T_H$. The current $i_s$, which has a value depending upon the instantaneous value of the voltages 69 and 70, can then produce a free oscillation in a resonant circuit including mainly the windings 20 and 21 of transformer 22, the magnetically loosely coupled coil halves 18 and 19 and the capacitor 23. By the choice of the capacitance of capacitor 23 the period of the resonant circuit (18, 19, 20, 21, 23) is approximately equal to twice the line fly-back time $\Delta T_H$. At the end of the line fly-back time $\Delta T_H$ the current $i_s$ will attain said given value in the negative sense after half a period of a cosinusoidal variation, after which the next following cycle can be performed under the action of the switching voltage 69.

At the middle of a field scan period $T_V$ the decreasing voltage 69 and the increasing voltage 70 have equal values. The currents $i_{s1}$ and $i_{s2}$ flowing during a line scan period $T_H$ will therefore also be equal to each other. As a result no current $i_s$ is induced in the windings 20 and 21. During the second half of a field scan period $T_V$ the voltage 70 is higher than the voltage 69 so that a current $i_{s2} - i_{s1}$ produces a magnetic flux in transformer 22. This corresponds to a current $i_s$ in a negative direction. This produces in the line deflection coil halves 18 and 19 a line frequency sawtooth correction current whose amplitude decreases more or less linearly to zero during the first half of a field scan period $T_V$ and increases during the second half, in which halves the directions of the correction currents are opposite each other at the end of a line scan period $T_H$. The circuit arrangement in accordance with the invention provides, in a simple manner, the change of the direction of the correction current $i_s$ required for color correction in each of the four quadrants of the screen of the display tube at the transition from one quadrant to the other.

The bridge circuit (18 to 23) and the opposite directions of the currents $i_{dp}$ through the bifilar windings 20 and 21 ensure that the line generator 1 and the modulator (18, 19, 27, 30, 51) for performing the East-West raster correction cannot affect the color correction modulator. The latter comprises basically the line deflection coil halves 18 and 19, the capacitor 23, the transformer 22 and the line frequency controlled diodes 65 and 66.

The color correction modulator includes the potentiometer 58 in order to adjust for a difference between the direct-voltage levels in the voltages 69 and 70. Thus, the instant at which the currents $i_{s1}$ and $i_{s2}$ have the same values can be displaced around the middle of the field scan period $T_V$. The result is that without affecting the bridge equilibrium of the line frequency correction current $i_s$, the instant of the zero value of the amplitude can be displaced. This adjustability may be required for carrying out a not completely symmetrical color correction.

In order to eliminate the disturbing influence of the threshold voltages and of the non-linear portion of the current-voltage characteristic curve of the diodes 65 and 66 on the switching operation, the resistor 64 is provided, which is traversed by a current $i_{s3} = i_{s1} + i_{s2}$. By means of the resistor 64 the current $i_{s3}$ is adjusted so that at the minimum amplitude of the current $i_{s2}$ at the beginning of the field scan period $T_V$ or of the current $i_{s1}$ at the end thereof, the voltage across the diode 66 or 65 is even higher than the threshold voltage. The line frequency current $i_{s3}$ then has a constant amplitude since an increasing amplitude of the current $i_{s2}$ is attended with an equal decrease of the amplitude of current $i_{s1}$.

Said color correction in a display device may also be carried out with the aid, for example, of the field deflection coil halves 42 and 43. In the modulator the free ends of the windings 20 and 21 of transformer 22, with which the capacitor 23 is connected in parallel, have to be connected to the field deflection coil halves 42 and 43 instead of to the line deflection coil halves 18 and 19. The junction of the windings 20 and 21 is connected to one end of the winding 41. It is furthermore possible to pass a correction current both through the line (18, 19) and the field deflection coil halves 42, 43 so that instead of a quasi-quadripolar field having two North or two South poles, a quadripolar field having four real poles is produced.

The transformer 22 comprising four windings 20, 21, 24 and 25 may be replaced by a bifilar coil having two series-connected windings. Since the transformer 22 provides a direct separation between the line deflection circuit and the color correction circuit coupled with the field generator 2, this embodiment is to be preferred in view of parasitic effects.

It appears that on the screen of a display tube in a color television display device the line deflection coils 18, 19 and the circuit arrangements shown in FIG. 1 are capable of performing, simultaneously and without interaction, the normal line deflection, the East-West raster correction of the pincushion distortion and the color correction.

In the circuit arrangements shown in FIG. 1 the line generator 1 feeds two parallel-connected deflection coil halves 18 and 19. In the circuit arrangements shown in FIG. 2, the line generator 1 feeds two series-connected deflection coil halves 18′ and 19′. The accents indicate the basically different mode of connection. Components similar to those of FIG. 1 are designated by the same reference numerals so far as there are no essential differences in the mode of connection. Slightly different components will be designated by different reference numerals.

The series connection of the deflection coil halves 18′ and 19′ is connected to one end of each of the windings 6 and 7 on the transformer 3 of the line generator 1. The other ends of the windings 6 and 7 are interconnected through the parallel combination of a coil 71 and a series connection of a capacitor 72, the linearity coil 16 and the capacitor 30, with which the winding 29 of transformer 3 and a coil 73 are connected in parallel. The junction of the capacitor 30 and the winding 29 is connected to ground. The coil 71 comprises two bifilar windings 74 and 75, the junction of which is connected through the parallel combination of a capacitor 23 and a winding 76 of a transformer 77 to the junction of the line deflection coil halves 18′ and 19′.

The transformer 77 comprises a primary winding having two series-connected windings 78 and 79, to which a line frequency-controlled, field frequency sawtooth voltage is applied for carrying out the color correction on the screen of a display tube in a color television display device. For carrying out the East-West raster correction of the pincushion distortion on the screen of the display tube in a monochrome or color television display device line frequency-controlled, field frequency parabolic voltage is applied to the capacitor 30.

The circuit arrangement shown in FIG. 2 for the East-West raster correction of the pincushion distortion is constructed as follows: through the transistor 45, connected as an emitter follower, the field generator 2 supplies to the capacitor 49 the field frequency parabolic voltage 50. The terminal of capacitor 49 at the voltage 50 is connected on the one hand to the cathode of a diode 80, the anode of which is connected to the junction of capacitor 30 and the coil 73, and on the other hand to the emitter of a pnp-type transistor 81, the collector of which is connected to a tapping on coil 73. In order to obtain a switching voltage between the base and the emitter of transistor 81, the transformer 3 is provided with a winding 82 directly connected to the emitter. The polarity of the voltage 83 indicates that the winding 82 is wound in the opposite sense to that of the other windings of transformer 3. This is not essential, but it serves to simplify the arrangement of FIG. 2. The other end of the winding 82 is connected through the parallel combination of a capacitor 84 and the series combination of a capacitor 85 and a coil 86 to the base of the transistor 81. Between the base and the emitter is connected the parallel combination of a capacitor 87 and a damping resistor 88.

As stated above with reference to FIG. 1, the line generator 1 supplies to the line deflection coil halves 18′ and 19′*a* line frequency sawtooth current $i_d$ of substantially constant amplitude supplied by the voltage 15. Since the inductance of coil 71 is much higher than the impedance of the paralle-connected series combination of coils 16 and 73, winding 29 and capacitors 30 and 72, the current $i_d$ flows substantially completely through this series combination. The current $i_d$ will produce across the coil 73 a voltage whose polarities are indicated by + and −. Across winding 29 of transformer 3 the magnetic coupling produces a voltage whose polarity is also indicated. By equalizing the voltage of winding 29 to that of coil 73, these voltages will neutralize each other due to the opposite phases. For the current $i_d$ the capacitor 30 is so to say short-circuited. The current $i_d$ can therefore not affect the voltage across capacitor 30.

The capacitor 72 is provided for the so-called S-correction for the case in which the current $i_d$ varies with time an S-shaped fashion instead of varying linearly during the line period $T_H$.

For carrying out the East-West raster correction of the pincushion distortion the voltage 50 is applied to capacitor 30 through the electronic switch comprising the diode 80 and the transistor 81 during the field scan period $T_V$ in each line scan period $T_H$. A cycle occurring during each line period is based on the beginning of a line scan period $T_H$, when capacitor 30 is at a voltage equal to the sum of the instantaneous value of the voltage 50 and the voltage drop across the current-conveying diode 80. The comparatively slight voltage drop across the diode 80 may be neglected as compared with the voltage 50, which remains more or less constant during the line scan period $T_H$. The diode 80 is traversed by a current decreasing substantially linearly to zero from the beginning of the line scan period $T_H$. At the middle of the line scan period $T_H$ transistor 81 has to start conducting and to convey uniformly a current in opposite sense. In order to eliminate the influence of the threshold voltage of diode 80 on the uniform take-over, transistor 81 is connected to the tapping of coil 73. In order to obtain the correct instant of current take-over, the switching voltage 83 is applied through the tuned network (84 to 88) to the base and the emitter of transistor 81. Said tuned network deforms the switching voltage 83 so that substantially at the middle of the line scan period $T_H$ the base of transistor 81 becomes negative with respect to the emitter. At the end of the line scan period $T_H$ the pulse of the switching voltage 83 cuts off transistor 81. Neglecting the stray inductances of the tightly coupled windings 6, 7 and 29 of transformer 3, a resonant circuit is thus excited in which the coil 73 is connected in parallel with capacitor 30 as well as the series combination of coil 16, capacitor 72 and the line deflection coil halves 18′ and 19′. The inductance of the resonant circuit is determined for the major part by the comparatively small value of the coil 73. By means of the capacitor 30 the period of the resonance frequency is set to be substantially equal to twice the line fly-back time $\Delta T_H$. As stated above with reference to FIG. 1, the condition is obtained at the end of the line fly-back time $\Delta T_H$ which has been the starting condition at the beginning of the line scan period $T_H$.

The circuit arrangement shown in FIG. 2 comprises a modulator which comprises, neglecting the linearity coil 16 and the S-correction capacitor 72, mainly the line frequency-controlled electronic switch having the diode 80 and the transistor 81, the capacitor 30 and the coil 73 in parallel there-with, and the series combination of the line deflection coil halves 18′ and 19′. In the field scan period $T_V$ the parabolically varying voltage 50 is applied to capacitor 30 during each line scan period $T_H$. The polarity of the voltage across capacitor 30 is opposite that of the voltage 15. The subtraction of these voltages means that the line deflection coil halves 18′ and 19′ are traversed by a line frequency sawtooth current $i_{dp}$ having a parabolically varying field frequency amplitude instead of being traversed by the current $i_d$ having a constant amplitude. As stated with reference to FIG. 1, an addition might also be carried out.

It appears that through the electronic switch comprising the diode 80 and the transistor 81 the capacitor 49 is charged for the first half of the line scan period $T_H$, whereas it is discharged for the second half. In this way an efficiency effect is obtained so that the performance of the East-West raster correction requires less power from the field generator 2. The circuit arrangement of FIG. 1 could, of course, also be provided with a more or less similar efficiency circuitry, in which, for example, a diode having opposite current direction is connnected in parallel with the transistor 51.

In FIG. 2, the circuit arrangement of FIG. 2 for color correction is constructed in the manner shown in FIG. 1 including windings 56 and 57 of transformer 31 in the field generator 2, the parallel-connected capacitors 60 and 61 and the diodes 65 and 66. For simplifying the arrangement the windings 56 and 57 are directly connected to each other. However, the potentiometer 58 and the capacitor 59 of FIG. 1 also may be provided. The diodes 65 and 66 are connected to the free ends of the series-connected and to ground-connected windings 78 and 79 of the transformer 77. Between the ground connection and the junction of capacitors 60 and 61 a series combination is arranged that includes the emitter-collector circuit of a transistor 89 and a winding 90 of a transformer 91. The emitter of transistor 89 is connected through a winding 92 of a transformer 93 to the base electrode. A winding 94 of transformer 91 and a winding 95 of transformer 93 are connected in opposite senses to the terminals A and B, which form the output terminals of the winding 55 of transformer 3. The windings 90 and 92 may also be directly arranged on transformer 3. Across the windings 90 and 92 appear the voltages 96 and 97, indicated as a function of time at one end thereof. The voltages 96 and 97 and the field frequency sawtooth voltages across the windings 56 and 57 produce the voltages 98 and 99 across the capacitors 60 and 61, indicated at a terminal thereof.

From the ground-potential level oV in the voltages 98 and 99 it appears that the diodes 65 and 66 are each capable of conducting only for half a field scan period $T_V$. The voltage 98 maintains the diode 65 conducting for the first half of the field scan period $T_V$. Under the action of the switching voltage 97 the transistor 89 will become conducting due to the negative voltage appearing at the base thereof during each line scan period $T_H$, which also applies to the diode 65. In dependence upon the instantaneous value of the field frequency-varying voltage 98, the winding 78 is traversed by a current $i_{s4}$, which induces in the secondary winding 76 of transformer 77 a corresponding current $2i_s$, indicated by an arrow. As a result a current $i_s$ flows through the series combination of the line deflection coil half 18', the winding 6 and the winding 74 and another current $i_s$ flows through the windings 19', 7 and 75 in series. No voltage will be produced across the bifilar windings 74 and 75 of the coil 71 owing to the opposite directions of the currents $i_s$ so that for the current $i_s$ the coil 71 may be considered to be short-circuited. The same applies to the fixed magnetically coupled windings 6 and 7 of transformer 3. As a consequence, transformer 77 feeds the parallel combination of the magnetically loosely coupled line deflection coil halves 18' and 19'.

At the beginning of the line fly-back time $\Delta T_H$ the transistor 89 is cut off under the action of the switching voltage 97 and the diode 65 can no longer be traversed by current. Thus a resonant circuit is excited which includes mainly the capacitor 23 and the winding 76 connected in parallel therewith and having a comparatively low inductance and the line deflection coil halves 18' and 19'. By means of capacitor 23 the period of the resonance frequency of the resonant circuit is adjusted to substantially twice the line fly-back time $\Delta T_H$. As stated above, the modulator comprising the line frequency-controlled electronic switch having diodes 65 and 66 and transistor 89 and said resonant circuit (23, 76, 18', 19') produce a line frequency sawtooth current $i_s$ whose amplitude depends for the first half of the field scan period $T_V$ upon the instantaneous value of voltage 98. The current directions through the line deflection coil halves 18' and 19' indicate that for carrying out the color correction the coil half 18' is traversed by the current $i_{dp} - i_s$ and the coil half 19' by the current $i_{dp} + i_s$.

For the second half of the frame period the diode 66 can conduct under the action of voltage 99. The current $i_{s5}$ passing through the winding 79 induces in winding 76 a current whose positive direction is opposite that of the arrow, that is to say the required negative direction through winding 76.

In order to obtain a uniform current change-over from the cut-off diode 65 to the conducting diode 66 the winding 90 is connected in series with the transistor 89. Apart from the voltage drop across transistor 89, the collector electrode thereof is at ground potential during a line scan period $T_H$. The end of winding 90 connected to the capacitors 60 and 61 is at a constant positive direct voltage under the action of the induced voltage 96 during the line scan period $T_H$. This direct voltage becomes manifest as an asymmetric value with respect to ground potential in the field frequency voltages 98 and 99. The low value of the direct-voltage component in the voltages 98 and 99, which value corresponds with the threshold voltage of diodes 65 and 66, provides the uniform current change-over at the middle of the frame period $T_V$.

The color correction circuit of FIG. 2 requires less power than that of FIG. 1. Since the diodes 65 and 66 each conduct only for half a frame period instead of a whole field scan period $T_V$, the ohmic losses of the arrangement are lower. The operation of transistor 89 of FIG. 2 requires less power from the line generator 1 than in FIG. 1, where diodes 65 and 66 are controlled by voltage 68.

It appears that by means of the circuit arrangements shown in FIGS. 1 and 2 the normal line deflection, the East-West raster correction of the pincushion distortion and said color correction can be carried out simultaneously and independently of each other. The windings 6 and 7 shown in FIG. 2 form part of a bridge including furthermore the coil 71, the line deflection coil halves 18' and 19', the winding 76 and the capacitor 23. A bridge equilibrium once fixed must not be disturbed by further tuning of the television display device. The decoupling effect of the coil 71 ensures that in a parallel connection therewith, the required corrections such as the S-correction can be performed without disturbances for, example, by means of a variable capacitor 72, and the linearity correction with the aid of the coil 16.

It will be obvious that the color correction circuitry of FIG. 2 may also be used with series-connected field deflection coil halves 42 and 43. It will furthermore be obvious that any combination of the embodiments of FIGS. 1 and 2 may be employed.

What is claimed is:

1. In a television display device having a line deflection coil and a field deflection coil, a circuit arrangement for producing a line frequency sawtooth current having a field frequency-varying amplitude comprising, a line deflection current generator and a field deflection current generator for supplying line and field frequency sawtooth deflection currents of substantially constant amplitude to said line and field-deflection coils, respectively, and a modulator controlled by the field deflection current generator for deriving the field frequency amplitude variation of the line frequency sawtooth current, said modulator comprising electronic switching means controlled by a signal of the line frequency, means including said switching means for coupling the field-deflection current generator, which provides a voltage having a field frequency variation, to a resonant circuit during the forward stroke of the line sawtooth current, said resonant circuit including the parallel combination of a capacitor and an inductor means comprising at least one deflection coil, the components of said resonant circuit being chosen so that the resonant circuit has a resonant period that is substantially equal to twice the fly-back time of the line frequency sawtooth deflection current.

2. A circuit arrangement as claimed in claim 1 wherein the line deflection coil includes two coil halves and the inductor means of the resonant circuit comprises at least four inductive components arranged in a bridge circuit, two of which comprise the two coil halves of the line deflection coil.

3. A circuit arrangement as claimed in claim 2 wherein the two coil halves of the line deflection coil in the bridge circuit are energized in parallel by the line deflection current generator, the two further inductive components of the bridge comprising two bifilar windings for decoupling the deflection current generator and the modulator.

4. A circuit arrangement as claimed in claim 3 wherein said bifilar windings are connected in series and form the secondary winding of a transformer, and means connecting the transformer primary winding through the electronic switching means to the field deflection current generator which supplies a substantially sawtooth-like voltage at the field frequency.

5. A circuit arrangement as claimed in claim 2 characterized in that the two coil halves of the line deflection coil arranged in said bridge circuit are energized in series by the line and field deflection generators, the further two inductive bridge components each being formed by a winding on a transformer included in the line and field deflection current generators and by a winding of a coil, the two coils being wound in bifilar fashion for decoupling the deflection current generator and the modulator.

6. A circuit arrangement as claimed in claim 5 wherein the capacitor is connected in the bridge circuit and in parallel with a secondary winding of a transformer, means connecting the transformer primary winding through the electronic switching means to the field deflection current generator which supplies a substantially sawtooth-like voltage thereto of the field frequency.

7. A circuit arrangement as claimed in claim 3 wherein the field deflection current generator, which supplies a substantially sawtooth-like voltage of field frequency, comprises a first transformer having two windings connected in series through the parallel combination of a potentiometer and a capacitor, said bifilar windings being connected in series and forming the secondary winding of a second transformer, means connecting the free ends of the windings of the first transformer through the electronic switching means to the free ends of the primary winding of said second transformer in the bridge circuit, and means connecting the arm of the potentiometer to a center tap on the second transformer primary winding.

8. A circuit arrangement as claimed in claim 1 for carrying out the East-West raster correction of the pincushion distortion on the screen of a display tube wherein the resonant circuit inductor means includes an inductive component connected in series with the line deflection current generator and the line deflection coil.

9. A circuit arrangement as claimed in claim 8 wherein the line deflection generator includes a transformer with a winding connected in series with said inductive component traversed by the line deflection current, means connecting said series combination in parallel with said capacitor, the voltage produced across said transformer winding of the series combination being equal and in an opposite sense to the voltage appearing across the inductive component produced by the flow of line deflection current therein thereby to decouple the line deflection current generator and the modulator.

10. A circuit arrangement as claimed in claim 8 wherein the field deflection generator includes means for deriving a voltage with a parabolic waveform at the field frequency, means connecting the capacitor of the resonant circuit and the electronic switching means in series with the terminals of a capacitor, one terminal of which is connected to the field deflection current generator which supplies thereto said parabolic voltage of field frequency.

11. A circuit arrangement as claimed in claim 3 wherein the resonant circuit inductor means includes an inductive component connected in series with the line deflection generator and the line deflection coil, said bridge circuit forming the inductance of a first resonant circuit including the two halves of the line deflection coil, means connecting said bridge circuit to the line deflection current generator in a series combination with said inductive component which forms a part of the inductance of a second resonant circuit.

12. A circuit arrangement as claimed in claim 5 wherein the resonant circuit inductor means includes an inductive component connected in series with the line deflection generator and the line deflection coil, the series combination of the two bifilar windings of the coil in said bridge circuit forming the inductance of a first resonant circuit including the two halves of the line deflection coil, means connecting said bifilar windings in parallel with an impedance means having a comparatively low impedance relative thereto, the impedance means including said inductive component which forms a part of the inductance of a second resonant circuit.

13. A circuit arrangement as claimed in claim 12 characterized in that said impedance means having a comparatively low impedance includes a capacitor for carrying out the S-correction connnected in series with said inductive component of the second resonant circuit.

* * * * *

PO-1050
(5/69)

UNITED STATES PATENT OFFICE
CERTIFICATE OF CORRECTION

Patent No. 3,697,801 Dated October 10, 1972

Inventor(s) HANNSPETER EULENBERG

It is certified that error appears in the above-identified patent and that said Letters Patent are hereby corrected as shown below:

col. 1, line 16, cancel "Belgian Pat. No. 712.525" and insert -- U.S. Patent 3,440,483 --;
line 20, cancel "having a" and insert -- amplitude modulated at the --; cancel "-varying amplitude";
col. 2, line 5, cancel "horizontal" and insert -- the horizontal or line --;
line 6, before "the" insert a comma (,);
line 26, cancel "permits of obviating part of the deformation" and insert -- can be used to correct a part --;
line 27, cancel "appearing in the form";
line 28, before "in" (1st occurrence) insert -- occurring --;
col. 3, line 53, cancel "free" and insert -- lower --;
col. 4, line 51, cancel the comma (,) and insert a period (.);
line 60, after "38" insert a comma (,); after "40" insert a comma (,);
line 61, after "39" insert a comma (,);
col. 5, line 55, cancel "an" and insert -- the --;
col. 8, line 29, cancel "for" and insert -- , the latter winding --;
col.10, line 13, cancel "both through" and insert -- through both --;
line 14, after "field" insert -- (42,43) --; cancel "42,43";
col.11, line 40, before the period (.) insert -- symbols --;
line 44, cancel "due to the opposite phases" and insert -- since they are in phase opposition --;
col.12, line 33, cancel "having" and insert -- including --;
col.13, line 56, cancel "of the";
line 57, cancel "resonance frequency";

PO-1050
(5/69)

UNITED STATES PATENT OFFICE
CERTIFICATE OF CORRECTION

Patent No. 3,697,801 Dated October 10, 1972

Inventor(s) HANNSPETER EULENBERG

It is certified that error appears in the above-identified patent and that said Letters Patent are hereby corrected as shown below:

IN THE CLAIMS col. 15, line 15, cancel "the line" and insert -- at least one --;
line 19, cancel "the line" and insert -- said one --;
line 21, cancel "of" and insert -- comprise --; cancel "in";
line 22, cancel "the bridge circuit" and insert -- which --;
line 35, cancel "of" and insert -- comprise --;
line 36, cancel "arranged in said bridge circuit" and insert -- which --;

col. 16, line 2, cancel "in the bridge circuit";
line 26, after "deriving" insert -- across a first capacitor --;
line 27, before "means" insert -- and --;
line 29, cancel "a" and insert -- said first --; cancel ", one terminal of" and insert a period (.);
lines 30-32, cancel the lines in their entirety;

On the cover sheet [54] the title should be canceled, and column 1, lines 1-5 should be canceled, and the following substituted: -- TV DISPLAY DEVICE HAVING A CIRCUIT ARRANGEMENT FOR PRODUCING A LINE FREQUENCY SAWTOOTH CURRENT AMPLITUDE MODULATED AT THE FIELD FREQUENCE -- .

Signed and sealed this 15th day of May 1973.

(SEAL)
Attest:

EDWARD M.FLETCHER,JR.
Attesting Officer

ROBERT GOTTSCHALK
Commissioner of Patents

3